July 7, 1964 R. A. SMITH ETAL 3,139,812
METHOD OF AND APPARATUS FOR THE CONTINUOUS COOKING AND
STERILIZATION OF LIQUIDS AND SUSPENSIONS
Filed May 23, 1958 4 Sheets-Sheet 1
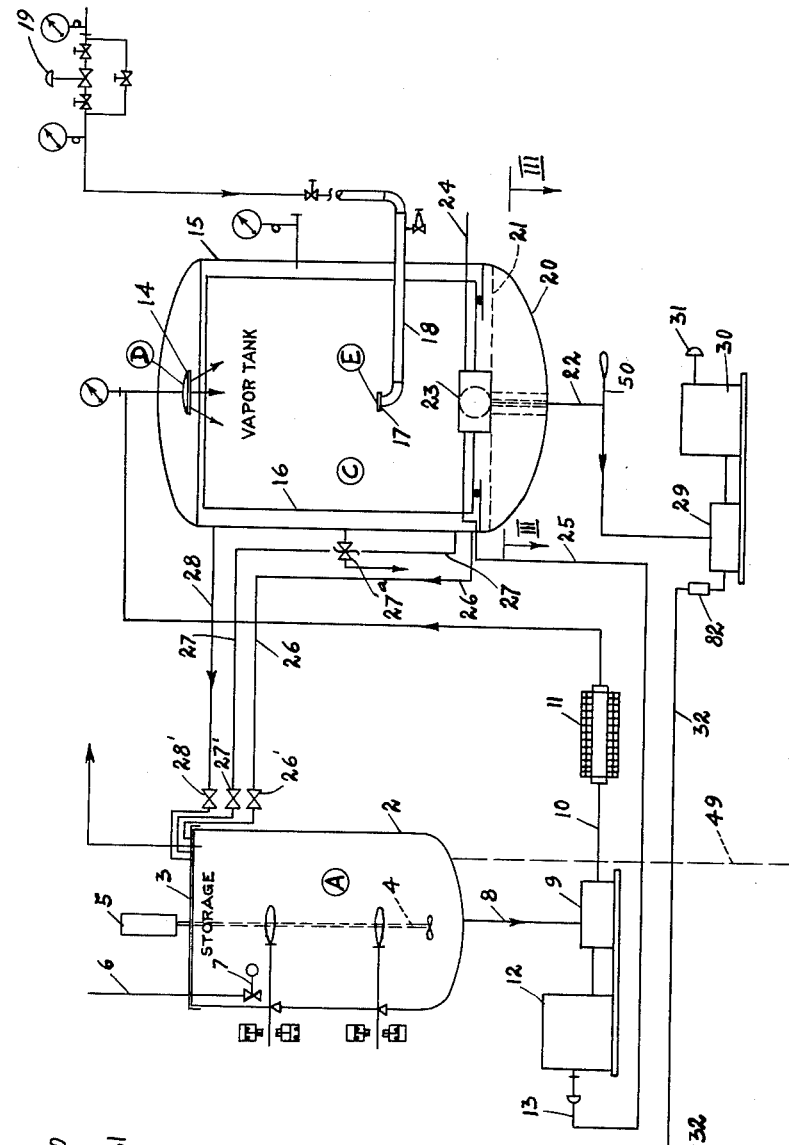
INVENTOR.
RICHARD A. SMITH.
FRANCIS WOJNAR.
BY
Christy, Parmelee, Strickland
ATTORNEYS

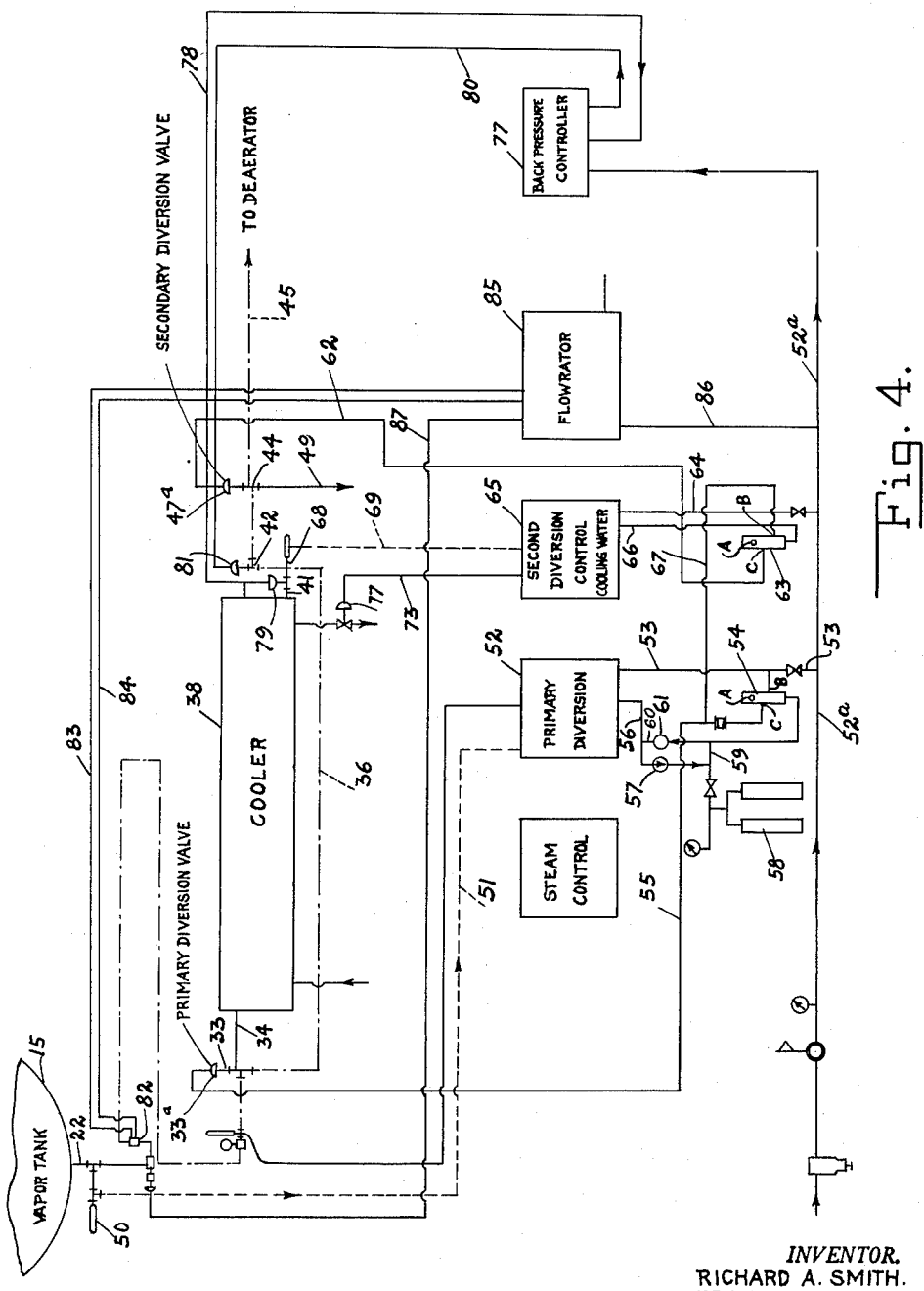

July 7, 1964  R. A. SMITH ETAL  3,139,812
METHOD OF AND APPARATUS FOR THE CONTINUOUS COOKING AND
STERILIZATION OF LIQUIDS AND SUSPENSIONS
Filed May 23, 1958  4 Sheets-Sheet 4

INVENTOR.
RICHARD A. SMITH.
FRANCIS WOJNAR.
BY
Christy, Parmelee + Strickland
ATTORNEYS.

United States Patent Office 3,139,812
Patented July 7, 1964

3,139,812
METHOD OF AND APPARATUS FOR THE CONTINUOUS COOKING AND STERILIZATION OF LIQUIDS AND SUSPENSIONS
Richard A. Smith, Gibsonia, and Francis Wojnar, Cheswick, Pa., assignors to H. J. Heinz Company, Pittsburgh, Pa., a corporation of Pennsylvania
Filed May 23, 1958, Ser. No. 737,430
3 Claims. (Cl. 99—251)

This invention relates to the so-called "flash" cooking and sterilization of liquids and suspensions of solids in liquids, and especially food products which, after being cooked and sterilized, are placed in cans and sealed, and is for a continuous process of flash cooking and sterilization.

The invention has for its primary object to provide a continuous method and apparatus for raising the temperature of the product to sterilizing temperature instantaneously and thereafter holding it at such temperature for the required period of time and cooling it after the required time and discharging it into a vessel from which it may be placed in cans.

A further object of the invention is to provide a cooking and sterilizing method and apparatus which will be substantially automatic and at the same time yield a product of improved quality.

A further object of the invention is to provide a sterilizing system which is designed to handle large volumes of product and assure uniform processing of the product before it is delivered to the cans.

These and other objects and advantages are secured by this invention as will be apparent to those skilled in the art.

While the invention is applicable to the processing of various substances, it has been especially developed for the processing of soup and liquids in which either finely divided or chunky solid ingredients may be carried or suspended.

By way of explanation, it may be pointed out that food products of this type are generally processed in kettles in batches, and heat is transferred to the contents of the kettle through the walls of the kettle. To secure adequate heating in a reasonable period of time, the walls of the kettle are usually heated to a temperature higher than the temperature required in the product itself. This results in overheating the product adjacent the sides and bottom of the kettle, introduces a possibility of scorching, and various ingredients such as oils, fats, and food solids are not simultaneously and uniformly subjected to the same temperature for the same period of time. This is detrimental to the product as is also the inclusion of air during cooking, which impairs color, flavor and even nutritional values of the food being processed.

In the present invention the product is almost instantaneously and uniformly brought to the desired temperature and not exposed to heat in excess of the desired maximum, while the product is deaerated simultaneously with its exposure to heat, resulting in preserving more of the natural flavor, color and nutritional values.

The invention may be more fully understood by reference to the accompanying drawings, in which:

FIG. 1A is a schematic view, largely in the nature of a flow sheet showing one part of the system;

FIG. 2 is a detail of a steam inlet nozzle used in the flash sterilizer;

FIG. 3 is a horizontal section in the plane of line III—III of FIG. 1A;

FIG. 4 is a diagram of the instrumentation of the system;

The invention will be first described in connection with the processing of liquids, such as broth or soup, as tomato soup, in which any solids are of minute size.

Figure 1B:
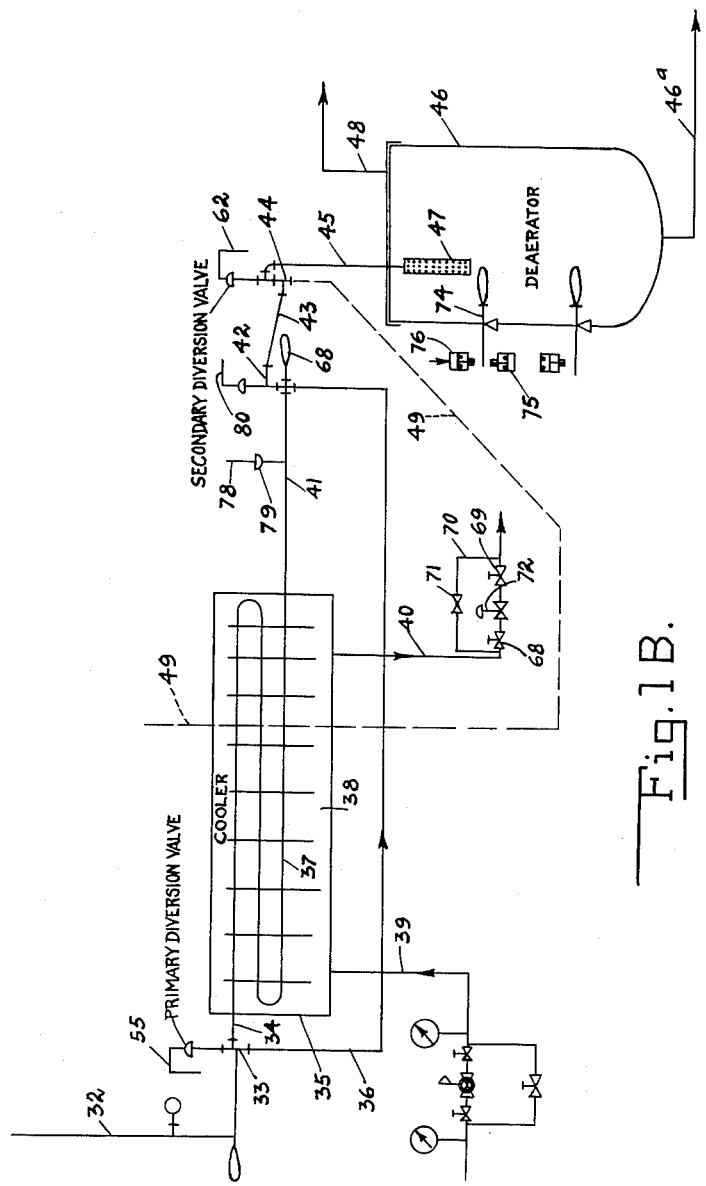
FIG. 1B is a similar view showing the remainder of the system.

Referring first to FIGS. 1A and 1B, these two views are complementary parts of a single drawing, but for clarity of illustration and to avoid reducing the drawing to such size that the necessary detail would be lacking, two separate sheets have been used. In these drawings 2 designates a storage tank with a cover 3. Within the tank is an agitator or mixer 4 driven by a motor 5 to prevent sedimentation and mix incoming product with that already in the vessel. The product is delivered to the tank 2 through a pipe 6 supplied from one or more mix tanks, the level of the incoming product being controlled by a float valve 7.

At the bottom of the tank 2 is a discharge pipe 8 leading to the intake of a pump 9 which discharges into pipe 10 having a line strainer 11 therein, which strainer would not be used where a product containing solids of a coarse nature is used. The pump is driven by a variable speed drive 12, such as a "Reeves Vari-Speed" motor with a control servo-motor 13, such as a Taylor Control Motor manufactured by Taylor Instrument Company. This is a pneumatic diaphragm type servo-motor, well known in the art, and which is coupled to the variable speed drive to maintain the required pump speed.

The pipe 10 leads to a spray nozzle 14 in the upper end of a closed environment such as vapor tank 15 of generally cylindrical form. Inside the vapor tank there is a cylindrical liner wall 16 spaced from the walls of the vessel 15 and extending throughout the greater portion of the height of the vessel 15. This liner is a baffle which prevents any liquid from spraying against the walls of the vessel 15, as these walls might be somewhat cooler than the prevailing temperature in the vessel.

Inside the vessel 15 at a level well below the nozzle 14 is an upwardly-directed steam discharge nozzle 17 which is at the end of the supply pipe 18. A suitable nozzle comprises a radially slitted disk as shown in FIG. 2. Steam in regulated volume and pressure is supplied to pipe 18 to maintain the desired pressure and temperature conditions in the vapor tank, and the nozzle 17 has adequate openings to prevent excessive back pressure in the pipe 18 within the vapor tank, as a high temperature of this pipe would cause soup contacting the exterior to burn. The control valve for supplying the steam is indicated schematically at 19 and there may be a pressure reducing valve (not shown) ahead of this. With this nozzle superheated or saturated steam at the required pressure to provide a sterilizing temperature may be maintained in the environment 15.

The bottom 20 of the tank is concaved to form a preferably shallow or small capacity catch basin. The interior of the bottom has several vertical baffle plates 21 to prevent swirling of the liquid as it flows out discharge pipe 22 at the center of the bottom. A minimum practical level of product is maintained in the concave bottom, and for controlling the liquid level there is a pilot valve float level control (such as a "Fisher Pilot Valve Float Level Control"), this being a standard piece of equipment schematically illustrated at 23, this device having a float controlled valve that governs the flow of air from a pressure supply line 24 to line 25 leading to the control 13 for the vari-speed drive 12 that drives pump 9. If the level in 20 tends to rise above the minimum, the pump 9 is slowed down, reducing the flow of liquid to the vapor tank, and if the level tends to reduce below the minimum, the speed of the pump is increased. The level is therefore maintained by changing the rate of flow of liquid to the vapor tank, the specific pieces of mechanism here used being standard well-known units.

In this part of the apparatus the entering liquid to be processed is sprayed into the vapor tank 15 and as the spray falls through the atmosphere of steam at the desired temperature and pressure, the individual drops resulting from the spray are exposed to the surrounding atmosphere of steam and are thereby almost instantaneously raised to sterilizing and cooking temperature under superatmospheric presure. This rapid heating under pressure preserves the flavor and color of the product and also releases entrained air, or deaerates the soup, the removal of air being important in the preservation of color and flavor.

For removing air there are two vent pipes 26 and 27 leading from a level close to the top of the liquid level, and a third pipe 28 leads from near the top of the vapor tank. Each of these lines is throttled through valves 26′, 27′ and 28′ respectively to permit a continuous bleed of steam from the vapor tank, and of course air will be carried away with the escaping steam. The three pipes 26, 27 and 28 terminate at the top of the storage tank so that condensate and condensible vapors having aromatic qualities are returned to the feed mix. A safety valve 27a is indicated in line 27 to relieve the vapor tank should pressure for any reason rise above a desired level. The steam which escapes through the above referred to vents is throttled to a degree where pressure is maintained in the vapor chamber without difficulty.

The pipe 22 is surrounded with insulation so that the product flowing through the pipe is held at sterilizing or cooking temperature. At 29 there is a second pump similar to pump 9 driven by a variable speed drive 30 similar to drive 12 with a control 31 similar to control 13. From the discharge pump, the liquid then flows through another insulated "holding" section of pipe 32.

At the end of the holding section 32 there is a primary diversion valve 33 which is air-actuated, this diversion valve being a three-way valve. Under normal operating conditions the liquid flows from pipe 32, through valve 33 into pipe 34 at the intake end of a heat exchanger or indirect cooler 35. In the other position of the three-way valve, the liquid is diverted from the cooler into a pipe 36.

The diversion valve may be what is known commercially as a Taylor three-way sanitary valve made by Taylor Instrument Company (Style 97VJ536).

The cooler 35 is of any conventional form, with a pipe 37 through which the soup flows and a surrounding chamber 38 through which water from a supply pipe 39 circulates, the water being discharged from the cooler through a pipe 40.

The soup or other liquid product leaves the cooler through pipe 41, flowing through pressure relief or back pressure valve 42 therein, and from the back pressure valve through pipe 43 to the inlet side of a secondary diversion valve 44, this being similar to the primary diversion valve. Under normal operating conditions this diversion valve passes the product into a pipe 45 which enters the top of a deaerator vessel 46, the pipe 45 having a perforated discharge terminal 47 thereon.

The deaerator 46 has a vapor vent 48 at the top leading to atmosphere, and at the bottom is a discharge pipe leading to the filling machines or other point of disposal. The interior of the deaerator is at atmospheric, or could with some products, be at sub-atmospheric pressure, which could be accomplished by connecting a suction fan to vent pipe 48. The distance from the back pressure valve to the deaerator is kept as short as possible, for the reasons hereinafter explained.

The other outlet of the secondary diversion valve 44 leads to pipe 46a that returns the rejected product to the tank 2.

The purpose of the diversion valves is to assure that any product that reaches the deaerator will have been held at the sterilizing temperature for the required period of time. For this purpose there is temperature responsive control or temperature bulb 50 in the discharge pipe 22 close to the vapor tank. If the temperature of the product leaving the vapor tank is too low, this bulb will operate the primary diversion valve 33 to divert the flow of product into line 36.

By way of explanation it may be pointed out first that the primary and secondary diversion valves are so connected and controlled that the secondary diversion valve is always open when the primary diversion valve is open, but the secondary diversion valve may open without the primary diversion valve being opened. In this way any product that is not heated sufficiently or which is overcooled is rejected and returned through pipe 49 to the tank 2.

The operation of the primary diversion valve may best be explained by reference to FIG. 4. The diversion valve 33 is a well-known type of diaphragm valve which is biased to divert the flow from the normal path if there is no air pressure on the diaphragm. As long as there is air pressure on the diaphragm, the liquid being processed will flow in the normal path through the cooler. There is a temperature-responsive bulb 50 above referred to in the line 22 close to the outlet of the vapor tank. This bulb is connected through a capillary tube 51 to a controller 52. The control instrument 52 is an apparatus available commercially known as No. 12ORV368 Taylor Full Scope Temperature Recording Controller made by the Taylor Instrument Company. It includes both recording and control functions. Under normal operating conditions air pressure flows from an air supply pipe 52a into branch pipe 53, into a pilot valve 54 having an inlet port B and an outlet port C. This is a Taylor 88S51 pilot valve of well-known commercial type having an internal valve element which is so ported as to normally establish a flow from the intake port at B to an outlet port at C. The air from C flows through pipe 55 to the diaphragm chamber 33a of the primary diversion valve 33. Pipe 53 also connects to the instrument 52, and through instrument 52 into pipe 56. From pipe 56 air can flow through a check valve 57 into a system that includes one or more air reservoirs 58. There is a pipe 59 that also leads from the reservoirs and the check valve to the bottom of the pilot valve 54. In addition to this there is a pipe 60 having a needle valve 61 therein. The internal construction of the controller 52 is such that if the temperature affecting the bulb 50 drops a predetermined amount, say 2°, a connection will be established from pipe 53 to pipe 56 so that high pressure air will flow from pipe 53 into pipe 56, thence through the check valve 57 and pipe 59 to the bottom of the pilot valve 54, and at the same time cause air to flow into the reservoirs 58. When air flows through the pipe 59 to the bottom of the pilot valve, the slide element in this valve will be moved to connect port C with a port at A, which vents the line 55 to atmosphere, thereby relieving the pressure in the diaphragm chamber 33a of the diversion valve, causing this valve to move to diverting position.

As soon as the soup or other liquid coming from the vapor tank reaches the proper temperature, the bulb 50 will respond to operate the control device 52 to open pipe 56 to atmosphere and break the connection between pipes 53 and 56. However the flow of liquid must continue to be diverted until all the liquid in the line between the bulb 50 and the primary diversion valve has been diverted, and liquid of the proper temperature has reached the primary diversion valve. This delay in the operation of the primary diversion valve to normal position for purging the system after the temperature bulb 50 responds to normal temperature condition is secured by adjusting the needle valve 61 so that air that has accumulated in the reservoirs 58 will bleed off very slowly, maintaining a pressure in line 69 and the bottom of the pilot valve 54 for the period of time required under normal conditions for the liquid of proper temperature to reach the diversion valve. In this way it is assured that when starting up, or at the time that the temperature falls below the desired sterilizing temperature, none of the product which is too cold, or which has been insufficiently heated, will flow into the cooler. The needle valve 61 and the capacity of tanks 58 is adjustable for the purpose of adjusting this time interval to the capacity of the system.

The secondary diversion valve is also of the diaphragm-operated type which permits a normal flow of liquid only when pressure is on the diaphragm, and which diverts when the pressure on the diaphragm fails. In FIG. 4 the secondary diversion valve 44 has a diaphragm chamber 45, and there is an air line 62 leading from a port at C of a pilot valve 63, this pilot valve being similar to the pilot valve 54. Air from the pipe 52a flows through pipe 64 into the secondary diversion valve control 65, and from this control there is a pipe 66 that leads into the bottom of the pilot valve 63. Pipe 67 leads from pipe 55 on the outlet side of the pilot valve 54 to inlet port at B of the pilot valve 63. The instrument 65 is a No. 122RV563 Taylor Full Scope Temperature Recording Controller. In the pipe 41 at the discharge end of the cooler there is a temperature-responsive bulb 68 that is connected through a capillary tube 69 to the controller 65. So long as there is a normal operating condition in the first diversion valve and bulb 68 is responding to fluid of the proper temperature at the discharge outlet of the cooler, air will flow from the pipe 55 on the outlet of the pilot valve 54, through pipe 67 to the inlet port at B of the pilot valve 63, and through this inlet port B to the outlet port at C, and thence through pipe 62 to the secondary diversion valve diaphragm chamber 44a. However if the pressure fails in line 67, pilot 63 will vent to the atmosphere through a port at A, and the secondary diversion valve will also move to the diverting position. The instrument 65, upon a decrease in temperature affecting the bulb 68, is designed to connect the line 64 with the line 66 causing the pilot valve to move to a position where line 62 is vented to atmosphere and communication between ports B and C is cut off.

It will thus be seen that the secondary diversion valve will never close unless there is pressure in the line 67 to close it, and that it will open if this pressure fails, or if the instrument 65 signals it to open. Thus the secondary diversion valve will be open at any time that the primary diversion valve is open and will close only if the primary diversion valve is closed, but the secondary diversion valve may also open and close independently of the primary one.

In the outlet line 40 for the cooling water there are hand valves 68 and 69 and a by-pass 70 with a hand valve 71 therein. Between the valves 68 and 69 there is also a pressure-operated throttle valve 72, which can be set to regulate the flow of cooling water. This is normally held in open position by air from the pipe 64 passing through the second diversion control 65 and pipe 73 leading from the second diversion control to the valve 72. This control regulates the flow of cooling water so that the temperature drop of the product flowing from the cooler may be maintained at a predetermined level. For the processing of tomato soup the product coming from the cooler should be at 220° F. so that the second diversion control regulates the flow of cooling water to maintain this temperature. If the product is over-cooled the sensing bulb 68 will operate the secondary diversion control, and at the same time open line 73 to the atmosphere, causing the valve 72 to close. Any product that is below 220° F. will then be diverted through line 49 back to the storage tank 2.

The control valve system is placed in the outlet line 40 so that if the flow of water is shut off the cooler will remain full of water and thereby prevent the product from "burning on" to the interior of the cooling coil 37. As soon as the sensing bulb 68 indicates that the temperature of the product is up to 220° F. or the desired discharge temperature, it will operate the second diversion control to restore the secondary diversion valve to its normal position, and at the same time open the valve 72 to restore the normal flow of cooling water.

The product which flows through pipe 45 into the deaerator thus enters the deaerator at 220° F. and is sprayed into the deaerator chamber where the release of pressure immediately causes it to flash down to 212° F. The steam which is liberated will be vented to the atmosphere, thereby ridding the product of some of the steam which is condensed into the product in the vapor chamber. Also when the product is flashed from 220° F. to 212° F., any remaining air entrained in the product will be released and vented through the pipe 48. The deaerator 46 has sufficient capacity so as to act as a reservoir whereby there may be a uniform flow to the filling machine notwithstanding slight variations that may occur in the sterilizing operation. A float 74 may be provided in the deaerator 46 for stopping the pump 29 if the level in the deaerator rises above a predetermined limit, this being effected electrically through a contact 75 in a well-known manner not important to the present invention. The same float 74 may light a signal light (not shown) by operating a contact 76 when the product falls below a predetermined level in the deaerator.

The back pressure valve 42 is governed by a back pressure controller 77 (see FIG. 4). This controller is connected through a capillary tube 78 with a pressure-responsive device 79 connected into the pipe 41 in advance of the valve 42. The pressure-responsive device is a well-known piece of apparatus such as a "Crosby Pressure Bowl." It responds to any variation in pressure in the line 41 and communicates such change to the back pressure controller 77. The back pressure controller 77 controls the flow of air from supply line 52a into pipe 80 leading to a diaphragm chamber 81 for actuating the back pressure valve. The back pressure controller is set to maintain a predetermined pressure in the line 41, and if the pressure drops, controller 77 actuates the diaphragm 81 to restrict the discharge of the product into the line 43, and if the pressure rises above a predetermined point, the reverse operation takes place to further open the back pressure valve. The back pressure valve is used to prevent the product from flashing back into the cooler, assuring sufficient pressure being maintained on the product to keep it at the 220° F. temperature. It is because of this that all piping between the back pressure control valve 42 and the deaerator is kept as short as possible, as there will be a tendency for a flash-back in this line to the back pressure control valve.

Close to the outlet of the pump 29 in the holding section 32 is a flowrator 82. This responds to the rate of flow of the product through the holding section, and it is connected through electric leads 83 and 84 with a control 85. This control is also a well-known type of equipment, being part of a "Fisher-Porter Flowrator." This flowrator controls air from pipe 52a through pipe 86 to pipe 87 that actuates a diaphragm 88 on the control 31 for the vari-speed drive 30 that operates the pump 29. The control 85 is set to drive the pump at a predetermined rate so that a fixed volume of fluid is flowing through the holding section in a given unit of time, say for example, six gallons per minute. Due to wear in the pump, or due to some change in the heat of liquid being supplied to the pump, or for some other reason, the pump may deliver less or more than the desired volume. In this case the flowrator 82 will act to control the flow of air from pipe 86 to pipe 87 and thereby operate the vari-speed controller 88 to increase or decrease the output of the pump to keep the rate of flow constant. Thus the flowrator operates to maintain the flow of liquid through the system at a predetermined rate. This is important since any change in the rate of flow might result in a change of temperature, or holding time of the products at the desired temperature.

In the overall operation of the system the product to be cooked and sterilized is discharged into the storage tank 2 from whence it is pumped to the vapor tank 15 where it is contacted by superheated or saturated steam and the droplets of spray instantly raised to sterilizing temperature. It is important that the product be sprayed from a nozzle so that it is broken up into small drops which are instantly and uniformly heated to the sterilizing temperature. An important feature of the vapor tank is the provision of the baffle 16 so that there is a curtain of steam between the baffle 16 and the exterior wall of the chamber, thereby avoiding any cooling or condensation of the product on the baffle. The heated product is collected in the bottom of the vaporizing chamber and the rate of feed of liquid is conrtolled by the float level control 23 operating on the Reeves Vari-speed drive 13 to regulate the flow of product to the vapor tank. The liquid flows from the vapor tank through pipe 22 and is pumped by the pump 29 through the flowrator 82 and the holding section 32. In starting up the system the fluid will be at a temperature lower than the required temperature and the holding section 32 will not be up to temperature. The temperature-responsive bulb 50 will therefore cause the primary diversion valve 33 to open and the product will flow through the holding section 32 and through pipe 36 to the second diversion valve 44. This valve is open at any time that the primary diversion valve is open, so that the product will flow through pipe 49 without passing through the cooler, and be returned to the storage tank 2. When the product is at the required temperature, temperature bulb 50 will respond to close the primary diversion valve, but because of the time lag arrangement provided by the air chambers 58 and associated mechanisms, this primary diversion valve will not establish a normal flow until product of the required temperature has reached the primary diversion valve. If the product is then passed through the cooler and is still under the desired temperature, the bulb 68 will keep the secondary diversion valve 44 open until the product contacting the bulb 68 is at the required temperature when the diversion valve 44 will establish a normal flow to the deaerator 16. The product will be delivered to the deaerator at a predetermined temperature above 212° F. As stated above, in the case of tomato soup, the product will be cooler in the cooler to 220° F. and will be flashed in the deaerator to 212° F., and from this the product will be delivered to the can-filling machines. The system will then continuously operate in this manner, and if the rate of flow tends to change, the flowrator will correct the rate of flow by operating the vari-speed control 31 in the manner above described. If the product at any time fails to be at the required temperature, the bulb 50 will respond by operating the primary diverson valve, and through it the secondary diversion valve to by-pass any product that is insufficiently heated, until such time as the product has again reached the desired temperature and the system has purged itself of any insufficiently-heated product.

At the deaerator any entrained air not removed in the injection tank will be released when the liquid is flashed and removed while a sufficient volume of liquid is maintained in the deaerator so as to supply the can-filling machine or machines at a constant rate notwithstanding interruption in the supply of liquid going through the sterilizing system.

Because of the liquid being sprayed into the vaporizing chamber in very fine drops, each drop is quickly and practically instantaneously raised to sterilizing temperature. There is a small volume of liquid in the catch basin at the bottom of the vaporizing chamber so that the average retention time of any particle in the chamber is very short. In the holding section of pipe the soup or other liquid does not contact the air. The flash heating serves to maintain the flavor which is not lost in the holding section or in the cooling section.

Figure 5:
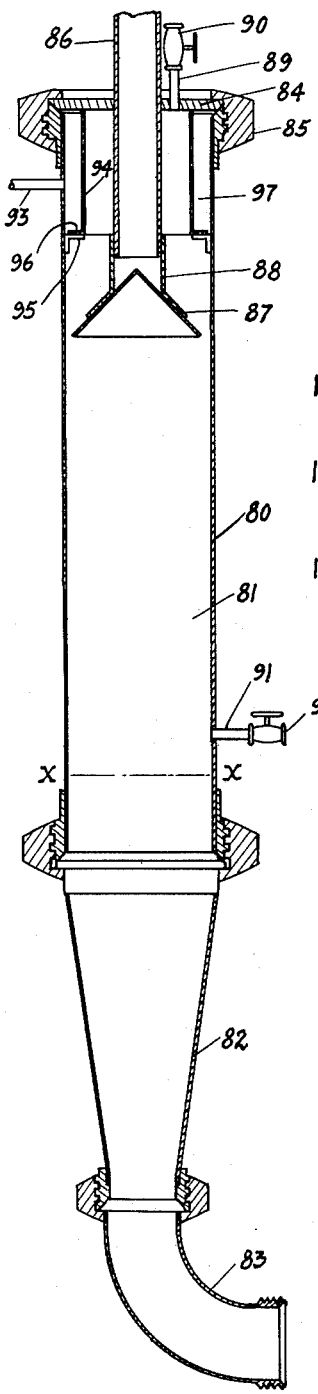
FIG. 5 is a vertical section through a product suspension apparatus which has proved especially useful for products having fine solids in suspension.

The modification shown in FIG. 5 shows another form of product injection tank particularly designed for use where the product has fine solids in suspension, the remainder of the system being the same as previously described. In this view 80 designates a cylindrical tube forming a chamber 81. At the bottom there is a conical collecting chamber 82 which delivers product into a pipe 83 corresponding to the product discharge pipe 22 in FIG. 1A. At the top of the cylindrical body 8 there is a cap 84 removably retained in place by a nut 85. The product is carried into the chamber 81 through pipe 86 at the center of the cap, this pipe projecting part way into the chamber, and it has a conical diverter 87 suspended below it in spaced relation to its end, the diverter being supported by brackets 88 secured to the cone and secured to the lower end of the pipe 86.

The cap 84 also has an air bleed pipe 89 carried thereby and passing through it, this air bleed pipe corresponding to the pipe 28 of FIG. 1A, and it has a valve 90 for limiting the flow of air and steam therefrom, this valve corresponding in purpose to the valve 28' of FIG. 1A. There is also an air bleed pipe 91 passing through the side of the tube 80, and it has a valve 92. This corresponds to the pipe 26 of FIG. 1A and the valve 26' of that figure. It is slightly above the normal liquid level in the unit when it is operating, this level being indicated by the line X—X.

Near the top of the chamber 81 there is a high pressure steam supply pipe 93. Inside the chamber concentric about the pipe 86 there is an annular baffle 94 supported on brackets 95, the baffle having an annular flange 96 that is turned outwardly toward the cylindrical wall 80, but which terminates in spaced relation to this wall. This baffle serves to divert the incoming stream, and cause it to flow annularly in the space 97 between the baffle 94 and the wall of the chamber. The steam circulates downwardly into the chamber around the edge of the flange 96.

In operation the product entering through the pipe 86 is discharged against the conical diverter 87 and spread into a thin stream by the cone 88. An atmosphere of steam at the proper temperature is maintained in the chamber 81, and the finely divided particles in the liquids are exposed to this atmosphere of steam as they fall through the chamber 81. They are thus almost instantly raised to the proper sterilizing or cooking temperature, while at the same time being deaerated in the manner described in connection with FIG. 1. In this case the collecting bottom of the suspension chamber is provided by the deep conical connector 82 so as to avoid sedimentation of the small particles which might occur with a shallow bottom as shown in FIG. 1A.

Figure 6:
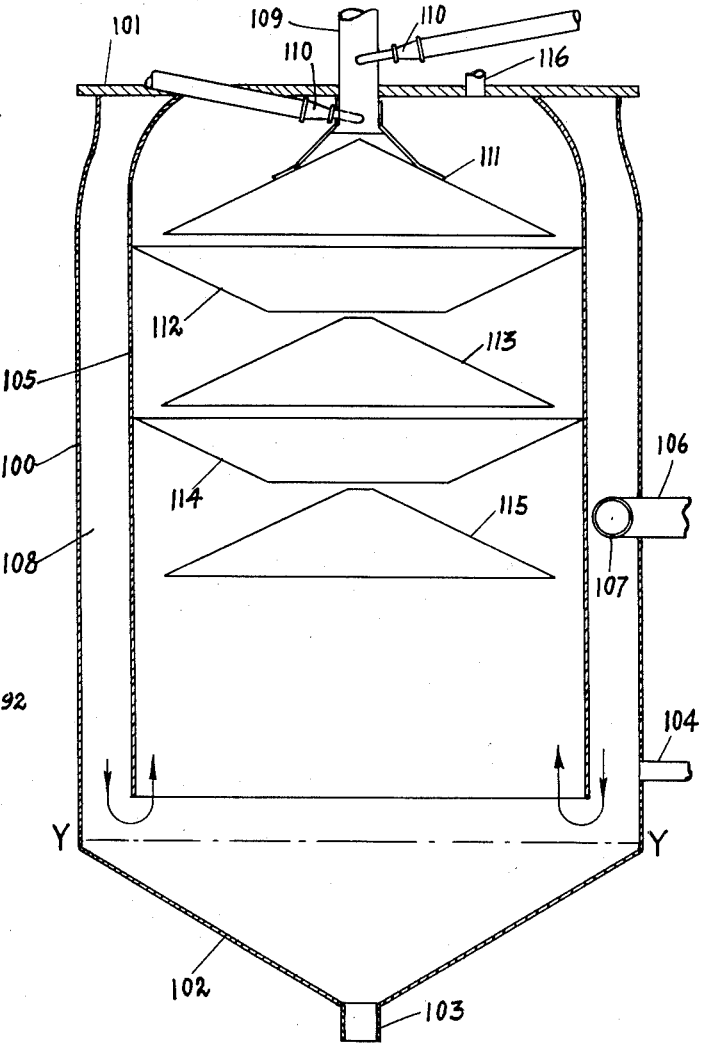
FIG. 6 is a view similar to FIG. 5 for a similar apparatus to be used with products having chunky solids in a liquid vehicle.

In the arrangement shown in FIG. 6 the injection tank is designed for the more effective processing of products having chunky solids carried in a liquid vehicle, and here again only the tank is shown since the balance of the system is the same as shown in FIGS. 1A and 1B and the other figures. In this figure there is an outer tank 100 with a cover 101 and a conical bottom 102, the bottom having a discharge pipe 103 corresponding again to the pipe 22 in FIG. 1A. There is an air vent 104 through the side of the tank corresponding to the pipe 26 of FIG. 1A, and it would of course be controlled by a valve similar to the valve 26', but not shown in this figure. Suspended from the cover 101 inside the tank is a cylindrical inner wall 105 which is spaced from the wall 100. Steam is introduced into the tank through pipe 106 which has a T 107 at its inner terminal for directing the steam into the annular space 108 between the side walls of the tank and the inner wall 105.

The product is introduced into the injection tank through the center of the cover of the pipe 109 in the cover of the tank and steam is introduced through one or more tangential steam inlet nozzles 110, these nozzles entering the lower end of the pipe 109 tangentially so as to impart a disintegrating and whirling action to the product as it is discharged into the chamber. Below the end of the pipe 109 there is a conical diverter 111 into which the product is discharged, and over which it is spread into a relatively thin layer, this layer constantly gravitating toward the outer edge of the cone 111. At the outer edge of the cone it falls into a reversely sloped or inverted conical baffle 112. It flows down this baffle toward the open center theerof, this center being in turn positioned above a second conical baffle 113 similar to the baffle 111. This in turn discharges into a second inverted conical baffle 114 and again the product is discharged onto a third conical diverter or baffle 115. The number of such baffles and the spacing can be arranged to secure the best results for a particular product. The edges of the baffle 115 are spaced from the inner wall 105 and the product discharged from it falls into the bottom 102 of the tank. The normal liquid level in the bottom of the tank is indicated by the line Y—Y. In the cover 101 there is also an air vent pipe 116 corresponding to the air vent pipe 28 of FIG. 1A, and which may be arranged similarly to the pipe 28 with a metering or control valve similar to the valve 28'.

In this tank the baffles act to check the free fall of the solid particles, so that they are exposed for a longer period of time to the atmosphere of steam inside the vessel before they eventually fall into the bottom of the tank. By reason of this there is adequate time for the chunky solid particles to be heated throughout to the required temperature, and this temperature is held in the product while the product is flowing through a holding section of tubing, as described in connection with FIGS. 1A and 1B. This arrangement, like the arrangement in FIG. 5, has the further advantage that while the steam is injected into the chamber, the discharge pipe for the steam is outside the path of travel of the product, so that the product cannot collect on the pipe as it may in the arrangement shown in FIG. 1A. The inner wall 105 protects the product from contact with the outer wall, and if desired, there may be such a wall in the construction shown in FIG. 5.

In each of the product injection tanks, the product is sprayed or broken up and is exposed to the atmosphere of steam in a dispersed condition. As a consequence all components and ingredients receive a sudden impact of heat which almost instantaneously effects the temperature increase required for cooking and sterilizing and then is held at the required temperature for the necessary time interval. The cooling from a superheated temperature to 212° F. or lower also occurs with about the same rapidity. Overheating of some product to insure adequate heating of the balance, as with kettles is avoided so that color, flavor, and vitamin and nutrient properties are better preserved, particularly since most of the air is removed in the injection tank. To those skilled in the art it will be appreciated that the uniformity of thermal shock, both on heating and on cooling, assures uniform processing of all oils, fats, and other qualities.

Thus, we have provided a continuous automatic heat processing method which results in both an improved product and which reduces the cost.

The process yields an improved product, and one in which uniform quality can be maintained much better than with existing batch methods of cooking and sterilization. There is a minimum possibility of scorching or burning any of the product and the rate of processing can be regulated to the capacity of the filling equipment. The product goes into the cans completely sterilized so that subsequent processing in autoclaves is not necessary. The invention results not only in an improved product, but also in a considerable operating economy.

The drawings are of a schematic character since the control equipment herein described is all standard, well-known equipment constituting no part per se of our invention, and its exact construction and operation is well-known to those skilled in the art. While we have indicated certain specific pieces of apparatus, this is merely by way of illustration and various changes and modifications may be made therein within the contemplation of our invention and under the scope of the following claims.

We claim:

1. A cooking and sterilizing apparatus for liquid food products and food products comprising liquids with solids in suspension therein by a process involving the flash heating of the product in finely-dispersed condition in an atmosphere of steam, followed by holding the product at sterilizing pressure and temperature for a period of time and the subsequent rapid cooling of the product, said apparatus comprising a storage reservoir, a vapor chamber having a dispersing means therein for breaking up and dividing incoming product into dispersed streams, means for forcing the product to be cooked and sterilized under pressure from the storage reservoir to the dispersing means and into the chamber whereby it is discharged into the chamber from the dispersing means in dispersed streams, means for supplying to the interior of the chamber steam under pressure and at a temperature to raise the dispersed product to the required cooking and sterilizing temperature, a sump at the bottom of the vapor chamber into which the product and any condensate from the steam is collected, means for regulating said means for forcing product into the vapor chamber to maintain a controlled liquid level in said sump, a holding section of pipe leading from the sump, a pump connected into the holding section of pipe for moving product from the sump through the holding section, flow controlled means in the holding section for regulating the pump to maintain a constant flow rate through the holding section, an indirect cooler at the discharge end of the holding section into which the product flows from the holding section for reducing the temperature of the product to a predetermined level, a deaerator vessel, a pipe leading from the cooler to the deaerator vessel terminating in a flash nozzle in the deaerator vessel, a back pressure valve in the pipe between the indirect cooler and deaerator by which a controlled pressure may be maintained on the product in the apparatus between the vapor chamber and said back pressure valve, a primary diversion valve in the discharge end of the holding section and the entering end of the indirect cooler, a bypass leading from the diversion valve to the storage reservoir, said diversion valve selectively connecting the holding section to the indirect cooler or to the bypass, diversion valve operating means, temperature responsive sensing means near the entering end of the holding section controlling the primary diversion valve and its operating means to direct product below a predetermined temperature into the bypass and direct product at the predetermined temperature into the indirect cooler, a secondary diversion valve between the cooler and the deaerator for directing the flow of product from the indirect cooler to either the deaerator or to said bypass, and a second temperature responsive means located in the discharge end of the indirect cooler responsive to the temperature of the product leaving the indirect cooler for controlling the operation of the second diversion valve.

2. A cooking and sterilizing system for liquid food products and food products comprising solids suspended in liquid as defined in claim 1 wherein means are provided in addition to said last-named temperature-responsive means for operating the secondary diversion valve to direct product into the bypass when the first diversion valve is positioned to divert product into a bypass so that the secondary diversion valve bypasses the product at all times that the first diversion valve is bypassing the liquid as well as at any time the product is below a predetermined safe temperature to flow into the deaerator.

3. A cooking and sterilizing system for liquid food products and food products comprising solids suspended in liquid as defined in claim 1 in which the indirect cooler is water-cooled with a water inlet and outlet, a control valve in the outlet of the cooler, and means controlled by said last-named temperature-responsive means which controls the secondary diversion valve for also regulating the water discharge valve from the cooler.

References Cited in the file of this patent

UNITED STATES PATENTS

| | | |
|---|---|---|
| 1,240,165 | Balzari | Sept. 18, 1917 |
| 2,041,059 | French | May 19, 1936 |
| 2,091,606 | Murray | Aug. 31, 1937 |
| 2,151,644 | Stephens | Mar. 21, 1939 |
| 2,165,094 | Fette | July 4, 1939 |
| 2,415,304 | Olson | Feb. 4, 1947 |
| 2,522,796 | Olson et al. | Sept. 19, 1950 |
| 2,549,575 | Conley | Apr. 17, 1951 |
| 2,572,527 | Seebald | Oct. 23, 1951 |
| 2,636,430 | Brown et al. | Apr. 28, 1953 |
| 2,682,827 | Gressly | July 6, 1954 |
| 2,732,308 | Laguilharre | Jan. 24, 1956 |
| 2,753,269 | Hawk et al. | July 3, 1956 |
| 2,801,087 | Hawk | July 30, 1957 |
| 2,902,048 | Ryan | Sept. 1, 1959 |

FOREIGN PATENTS

| | | |
|---|---|---|
| 548,569 | Great Britain | Oct. 15, 1942 |